(12) United States Patent
Chon et al.

(10) Patent No.: US 9,189,867 B2
(45) Date of Patent: Nov. 17, 2015

(54) ADAPTIVE IMAGE PROCESSING APPARATUS AND METHOD BASED IN IMAGE PYRAMID

(71) Applicant: HANWHA TECHWIN CO., LTD., Changwon-Si (KR)

(72) Inventors: Je-Youl Chon, Changwon (KR); Hwal-suk Lee, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 154 days.

(21) Appl. No.: 13/857,198

(22) Filed: Apr. 5, 2013

(65) Prior Publication Data

US 2014/0064626 A1   Mar. 6, 2014

(30) Foreign Application Priority Data

Aug. 30, 2012 (KR) .................. 10-2012-0095960

(51) Int. Cl.
| | |
|---|---|
| G06K 9/62 | (2006.01) |
| G06T 9/00 | (2006.01) |
| G06T 5/00 | (2006.01) |
| G06K 9/00 | (2006.01) |
| G06K 9/68 | (2006.01) |
| H04N 7/18 | (2006.01) |
| H04N 19/33 | (2014.01) |
| H04N 19/53 | (2014.01) |

(52) U.S. Cl.
CPC .............. *G06T 9/00* (2013.01); *G06K 9/00369* (2013.01); *G06K 9/6857* (2013.01); *G06T 5/00* (2013.01); *G06T 2207/20016* (2013.01); *H04N 7/18* (2013.01); *H04N 19/33* (2014.11); *H04N 19/53* (2014.11)

(58) Field of Classification Search
None
See application file for complete search history.

(56) References Cited

U.S. PATENT DOCUMENTS

| | | | |
|---|---|---|---|
| 8,126,291 B2 | 2/2012 | Paragios et al. | |
| 8,184,880 B2 | 5/2012 | Zhao et al. | |
| 8,340,415 B2 * | 12/2012 | Hoppe et al. | ............... 382/167 |
| 2011/0243438 A1 | 10/2011 | Hoppe et al. | |

* cited by examiner

*Primary Examiner* — Thomas Conway
(74) *Attorney, Agent, or Firm* — Sughrue Mion, PLLC (57) ABSTRACT

An adaptive image processing apparatus includes a first matching unit selecting representative candidate images from among a plurality of images included in an image pyramid and calculating a first matching score between each of the representative candidate images and a target model; a second matching unit selecting one scale level from among scale levels of the representative candidate images based on the first matching score and calculating a second matching score between each of images having scale levels included in a dense scale level range with respect to the selected scale level and the target model; a representative scale level selecting unit selecting at least one of the scale levels included in the dense scale level range as a representative scale level based on the second matching scores; and an image processing unit performing image processing based on an image having the selected representative scale level.

20 Claims, 5 Drawing Sheets

SPARSELY CHECK FOUR REPRESENTATIVE CANDIDATE IMAGES
-> HIGHEST SCORE : 1X

FIG. 3B

DENSELY CHECK REPRESENTATIVE SCALE LEVEL
-> HIGHEST SCORE : 1.3X

FIG. 4B

ADAPTIVE IMAGE PROCESSING APPARATUS AND METHOD BASED IN IMAGE PYRAMID

CROSS-REFERENCE TO RELATED PATENT APPLICATION

This application claims priority from Korean Patent Application No. 10-2012-0095960, filed on Aug. 30, 2012, in the Korean Intellectual Property Office, the disclosure of which is incorporated herein in its entirety by reference.

BACKGROUND

1. Field

Methods and apparatuses consistent with exemplary embodiments of the present inventive concept relate to adaptive image processing in an image pyramid, and more particularly, to an adaptive image processing apparatus and method which sparsely extracts samples according to scale levels of an image pyramid from the image pyramid in which a plurality of images having different scale levels are aligned according to scale levels, searches for a suitable scale level around a scale level selected from the extracted samples, and performs image processing on the suitable scale level.

2. Description of the Related Art

A technology of extracting a feature point from an image, for example, an image obtained by a camera, is widely used in a computer vision field including personal authentication, three-dimensional (3D) reconstruction, and tracking. Representative examples of an algorithm for extracting a feature point from an image include a scale-invariant feature transform (SIFT) algorithm and a speeded up robust feature (SURF) algorithm which may detect an object in a scale-invariant manner. For such scale-invariant characteristics, an image pyramid technique may be used.

An image pyramid technique involves converting a model to be matched and an input image into images having various scales and performing an operation according to algorithms for extracting a feature point or performing other image processing. For example, when an SIFT algorithm that is a representative algorithm for extracting a feature point in a scale-invariant manner is used, an image pyramid technique may pass a filtered image through a Gaussian filter having variances of various scales to obtain resultant images, sequentially smooth the resultant images according to adjacent scales to derive a Gaussian smoothed image, subsample the Gaussian smoothed image by a factor of two (2) to obtain resultant images, repeatedly pass the resultant images through the Gaussian filter having the variances of various scales to form an image pyramid composed of Gaussian smoothed images, and perform a series of operations for image processing on the image pyramid.

Such an image pyramid technique has a disadvantage in that an operation time is too long. This is because after an input image is resized to obtain images having various scale levels, a feature point is detected from an entire area of each image or other image processing needs to be repeatedly performed. Since a feature point is detected and operations for image processing are repeatedly performed on images having various scale levels, an operation time is increased and a false positive rate is increased.

SUMMARY

One or more exemplary embodiments provide an adaptive image processing apparatus and method for an image pyramid which may reduce an operation speed and reduce a false positive rate by selecting a scale level of an image on which image processing is to be adaptively performed without performing image processing on all images having various scale levels included in the image pyramid.

Technical problems to be addressed by the inventive concept are not limited to the above-described technical problems and one of ordinary skill in the art will understand other technical problems form the following description.

According to an aspect of an exemplary embodiment, there is provided an adaptive image processing apparatus including: a first matching unit which selects a plurality of representative candidate images from among a plurality of images included in the image pyramid and calculates a first matching score between each of the plurality of representative candidate images and a target model; a second matching unit which selects one scale level from among scale levels of the plurality of representative candidate images based on the first matching score and calculates a second matching score between each of images having scale levels included in a dense scale level range with respect to the selected scale level and the target model; a representative scale level selecting unit which selects at least one of the scale levels included in the dense scale level range as a representative scale level based on the second matching scores; and an image processing unit which performs image processing based on an image having the selected representative scale level.

According to an aspect of another exemplary embodiment, there is provided an adaptive image processing method including: selecting a plurality of representative candidate images from among a plurality of images included in an image pyramid and having different scale levels; calculating a first matching score between each of the plurality of representative candidate images and a target model; selecting one scale level from among scale levels of the plurality of representative candidate images based on the first matching score; calculating a second matching score between each of images having scale levels included in a dense scale level range with respect to the selected scale level and the target model; selecting at least one from among the scale levels included in the dense scale level range based on the second matching scores as a representative scale level; and performing image processing based on an image having the representative scale level.

BRIEF DESCRIPTION OF THE DRAWINGS

The above and other aspects of the inventive concept will become more apparent by describing in detail exemplary embodiments thereof with reference to the attached drawings, in which.

DETAILED DESCRIPTION OF THE EXEMPLARY EMBODIMENTS

As used herein, the term "and/or" includes any and all combinations of one or more of the associated listed items. Expressions such as "at least one of," when preceding a list of elements, modify the entire list of elements and do not modify the individual elements of the list.

The following merely illustrates the principles of the inventive concept. It will thus be appreciated that one of ordinary skill in the art will be able to devise various arrangements which, although not explicitly described or shown herein, embody the principles of the inventive concept and are included within its spirit and scope. Furthermore, all examples and conditional language recited herein are principally intended expressly to be only for pedagogical purposes and to aid the reader in understanding the principles of the inventive concept contributed by the inventors to furthering the art, and are to be construed as being without limitation to such specifically recited examples and conditions. Moreover, all statements herein reciting principles, aspects, and exemplary embodiments of the inventive concept, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Functions of various devices that are illustrated in drawings including a function block denoted as a processor or as a similar concept with the processor, can be provided not only with specific hardware but also general hardware in which related software may be executed. When these functions are provided by the processor, the functions may be provided by a singular specific processor, a singular sharable processor, or plural processors in which sharing between the plural processors is possible. Also, usage of terms such as a processor, a control, or the like should not be construed as being limited to hardware capable of executing software but should be construed as indirectly including digital signal processor (DSP) hardware, read-only memory (ROM), random-access memory (RAM), and non-volatile memory used for storing software. Other well-known related-art hardware devices may be included.

Herebelow, when publicly known techniques or structures related to the exemplary embodiments may unnecessarily make the inventive concept unclear, the detailed description will be omitted.

It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

The inventive concept will now be described more fully with reference to the accompanying drawings, in which exemplary embodiments of the inventive concept are shown.

Figure 1:
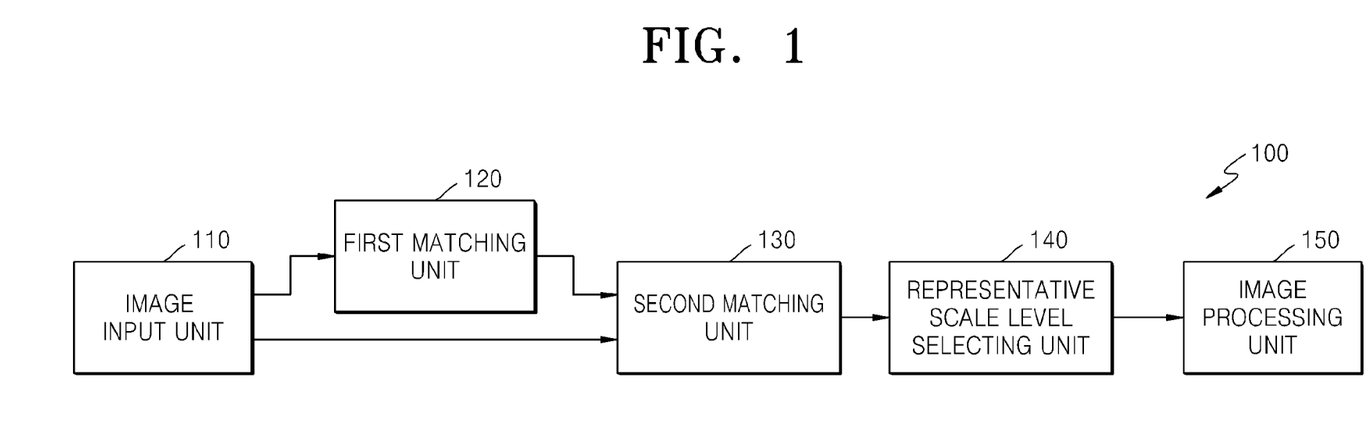
FIG. 1 is a block diagram illustrating an adaptive image processing apparatus for an image pyramid, according to an exemplary embodiment.

FIG. 1 is a block diagram illustrating an adaptive image processing apparatus 100 for an image pyramid, according to an exemplary embodiment.

Referring to FIG. 1, the adaptive image processing apparatus 100 includes an image input unit 110, a first matching unit 120, a second matching unit 130, a representative scale level selecting unit 140, and an image processing unit 150.

The image input unit 110 receives an image pyramid in which a plurality of images having different scale levels are included for image processing according to an algorithm having scale-invariant characteristics. Here, the plurality of images may be images of a same scene captured in different scale levels.

The image pyramid in which the plurality of images having the different scale levels are aligned according to scale levels may be input to the image input unit 110.

The first matching unit 120 sparsely selects a plurality of representative candidate images from the image pyramid input to the image input unit 110, and matches each of the selected representative candidate images to a target model.

When the representative candidate images are sparsely selected, it means that images are selected to be separated apart by the same interval in an alignment order of the image pyramid. For example, when 45 images of different scale levels are aligned according to scale levels in the image pyramid, four (4) images, that is, the $10^{th}$, $20^{th}$, $30^{th}$, and $40^{th}$ images, are selected from among the 45 images. In other words, the representative candidate images may be selected by using a systematic sampling method from among statistical sample extracting methods.

The first matching unit 120 calculates a matching score between each of the representative candidate images and the target model by matching each of the selected representative candidate images to the target model. In this case, representative examples of an algorithm for calculating a matching score may include, but are not limited to, a convolution algorithm and a correlation coefficient-based algorithm.

The second matching unit 130 selects one scale level from among the representative candidate images based on the matching scores calculated for the representative candidate images. In this case, it is preferable, but not necessary, that a scale level of a representative candidate image having a highest matching score may be selected from among the representative candidate images.

After selecting one scale level based on its matching score, the second matching unit 130 calculates a matching score between each of images of scale levels included in a dense scale level range with respect to the selected scale level and the target model by matching each of the images of the scale levels included in the dense scale level range and the target model.

The dense scale level range includes, in the alignment order in which the images having the different scale levels are aligned according to scale levels in the image pyramid, scale levels included in a predefined range with respect to the scale level selected by the second matching unit 130. When an image of a $10^{th}$ scale level is selected by the second matching unit 130 from among 45 images having different scale levels, a dense scale level range may include scale levels from a $7^{th}$ scale level to a $13^{th}$ scale level, for example. Here, the $7^{th}$ scale level and the $13^{th}$ scale level are separated apart by three (3) levels from the $10^{th}$ scale level, respectively. This size of the dense scale level range may be predefined. The size of the dense scale level range may vary according to, but is not limited to, system settings, the number of images having different scale levels included in the image pyramid, the number of representative candidate images, and an interval between the representative candidate images in the alignment order.

The representative scale level selecting unit 140 selects at least one from among the scale levels included in the dense scale level range as a representative scale level based on the matching scores calculated by the second matching unit 130.

In this case, a value, which is a basis for selecting the representative scale level, may be a unique threshold value of an image processing algorithm to be performed later. Alternatively, a scale level having a highest matching score may be selected as the representative scale level.

The image processing unit 150 performs image processing based on an image of the representative scale level selected by the representative scale level selecting unit 140. Examples of the image processing may include extracting a feature point to extract an object related to the target model from the image of the representative scale level, for example, a human, a non-human animal, or a vehicle, and performing other image processing.

The adaptive image processing apparatus 100 of the present embodiment may be mounted on any of video processing systems using an image pyramid technique such as an intelligent video surveillance (IVS) system that is used as a part of or in conjunction with a closed circuit television (CCTV) system used in security, surveillance, and related homeland security and anti-terrorism system, an IVS system that processes surveillance video in a retail establishment in order to establish an in-store human behavior trend for market research purposes, an IVS system that monitors traffic conditions in order to detect wrong-way traffic, broken-down vehicles, accidents, and road blockages, and a video compression system.

Each IVS system is a system that further processes video after video segmentation steps to perform object classification in which foreground objects may be classified as a general class such as animal, vehicle, or other moving but-unclassified object, or may be classified in more specific classes as human, small- or large-non-human animal, automobile, aircraft, boat, truck, tree, flag, or water region. In each IVS system, once such video segmentation and classification occurs, detected objects are processed to determine how their positions, movements and behaviors relate to user-defined virtual video tripwires, and virtual regions of interest (where a region of interest may be an entire field of view, or scene). User-defined events that occur will then be flagged as events of interest that will be communicated to the security officer or professional on duty. Examples of such events include a human or a vehicle crossing a virtual video tripwire, a person or vehicle loitering or entering a virtual region of interest or scene, or an object being left behind or taken away from a virtual region or scene. The present inventive concept may be related to segmenting video frames into their component parts using statistical properties of regions comprising the video frames.

As such, a video processing system on which the adaptive image processing apparatus 100 of the present embodiment is mounted may reduce an operation time and reduce a false positive rate by performing matching or image processing on only adaptively selected images without performing matching or image processing on all images of scale levels included in the image pyramid.

Figure 2:
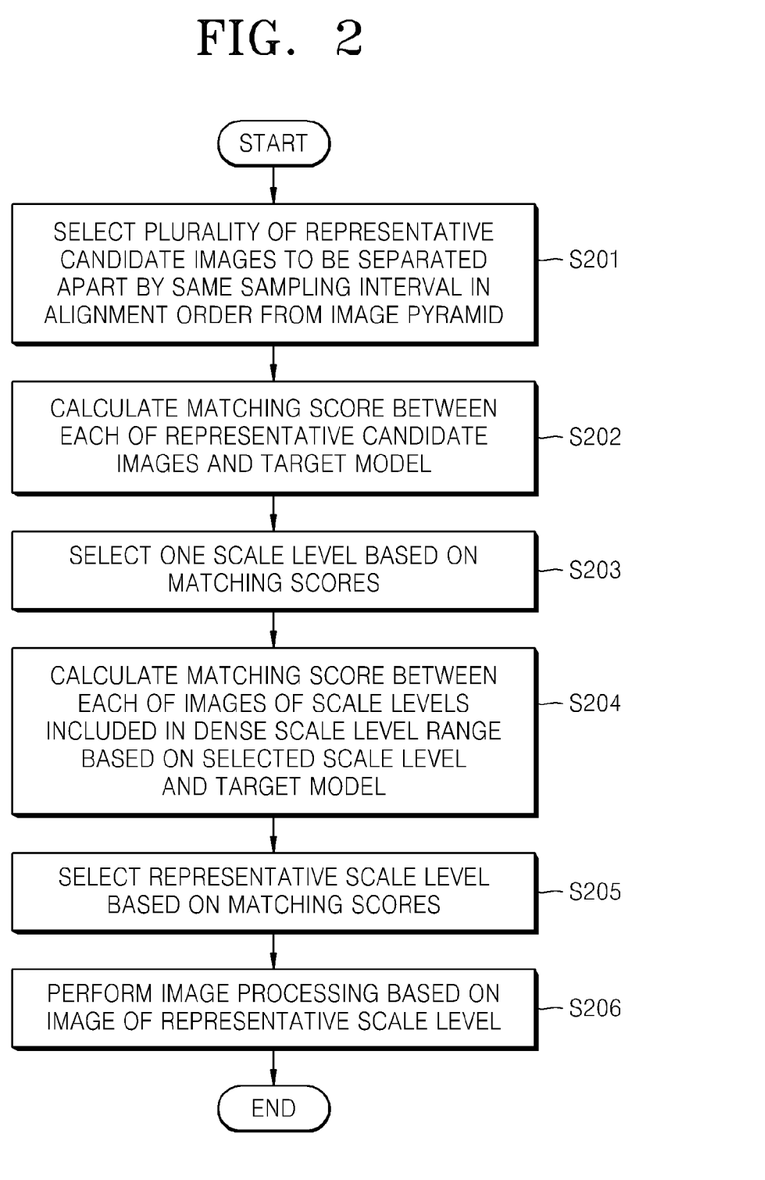
FIG. 2 is a flowchart illustrating an adaptive image processing method for an image pyramid, according to an exemplary embodiment.

FIG. 2 is a flowchart illustrating an adaptive image processing method for an image pyramid, according to an exemplary embodiment. The adaptive image processing method of FIG. 2 may be performed by the adaptive image processing apparatus 100 of FIG. 1. Accordingly, the same elements and operations as those of the adaptive image processing apparatus 100 of FIG. 1 will not be explained.

First, in operation S201, a plurality of representative candidate images are selected to be separated apart by the same sampling interval in an alignment order of the image pyramid in which a plurality of images having different scale levels are aligned according to scale levels. The representative candidate images may be selected by using a systematic sampling method.

In operation S202, a matching score between each of the plurality of representative candidate images selected in operation S201 and a target model is calculated.

The target model may be a model related to an object to be extracted through image processing. In general, the target model is a model formed by statistically learning feature information such as a human, a non-human animal, or a vehicle whose image is to be detected. The object related to the target model may be extracted from an image through matching between the target model and each of the images.

In this case, representative examples of an algorithm for calculating a matching score between each of the representative candidate images and the target model may include, but is not limited to, a convolution algorithm and a correlation coefficient-based algorithm.

In operation S203, one scale level is selected from the representative candidate images based on the matching scores calculated in operation S202. Preferably, but not necessarily, a scale level of a representative candidate image having a highest matching score may be selected from the representative candidate images.

In operation S204, a matching score between each of images of scale levels included in a dense scale level range about the scale level selected in operation S203 and the target model is calculated. The dense scale level range may include scale levels included in a predefined range with respect to the scale level selected in operation S203 in the alignment order in which images having different scale levels are aligned according to scale levels in the image pyramid. A size of the dense scale level range may be predefined, and the predefined range may be set according to, but is not limited to, system settings, the number of images having the different scale levels included in the image pyramid, the number of representative candidate images, and an interval in the alignment order between the representative candidate images.

In operation S205, at least one scale level is selected from among the scale levels included in the dense scale level range as a representative scale level based on the matching scores calculated in operation S204.

In this case, a scale level having a matching score equal to or greater than a threshold value set according to the image processing algorithm from among the scale levels included in the dense scale level range or a scale level having a highest matching score from among the scale levels included in the dense scale level range may be selected as the representative scale level, and when there are a plurality of the scale levels satisfying the conditions, a plurality of the representative scale levels may exist.

In operation S206, image processing is performed based on an image of the representative scale level selected in operation S205. In operation S206, a feature point may be extracted in order to extract an object related to the target model from the image of the representative scale level, for example, a human, a non-human animal, or a vehicle, or other image processing may be performed.

Figure 3A:
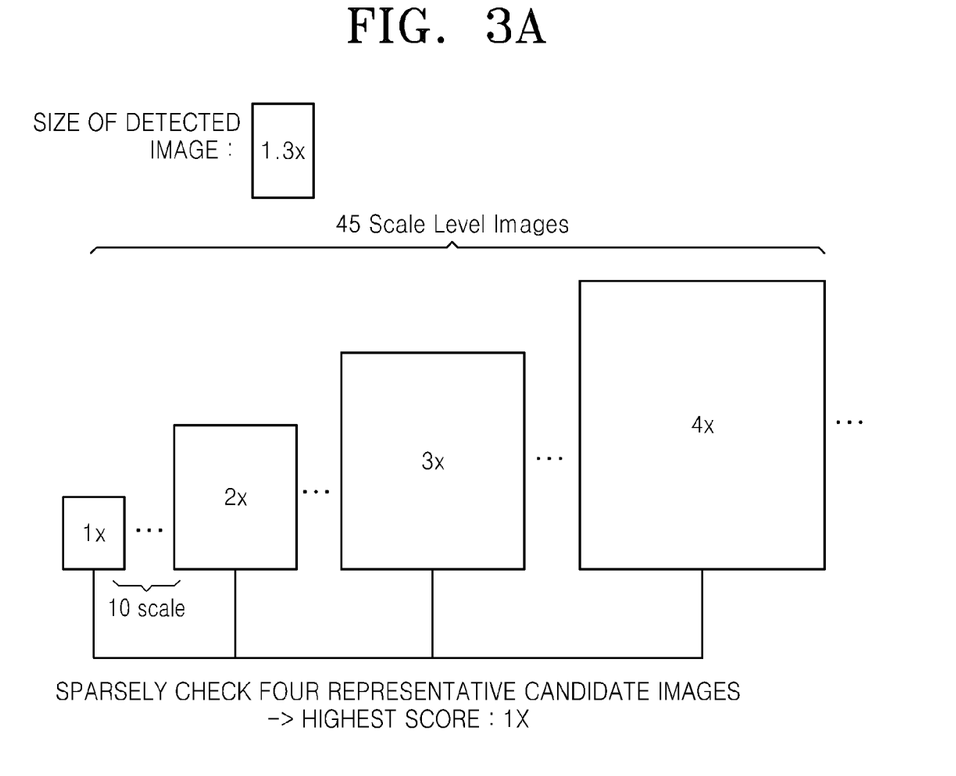
FIGS. 3A and 3B are diagrams for explaining a process of selecting scale level of an image on which an operation is to be performed from the image pyramid, according to an exemplary embodiment.
Figure 3B:
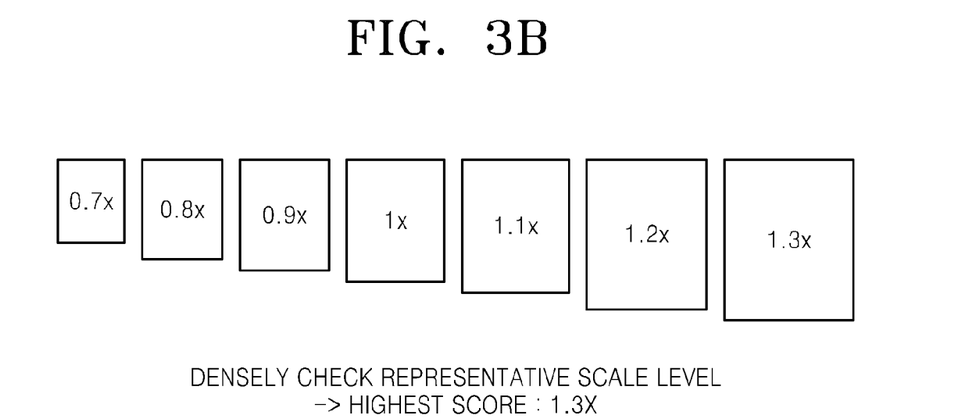

FIGS. 3A and 3B are diagrams for explaining a process of selecting a scale level of an image on which an operation is to be performed from an image pyramid, according to an exemplary embodiment.

Referring to FIG. 3A, the image pyramid including 45 images having different scale levels is input, and four images having 1×, 2×, 3×, and 4× scale levels are sparsely extracted at predetermined scale level intervals as representative candidate images among the 45 images.

Matching is performed on the extracted four images, an image having a highest matching score is found to be the image having the 1× scale level, and the image having the 1× scale level is selected from among the four images.

Referring to FIG. 3B, when matching is performed on images in a dense scale level range including scale levels from a 0.7× scale level to a 1.3× scale level around the scale level 1× of the image selected in FIG. 3A, it is found that a scale level having a highest matching score is the 1.3× scale level. The 1.3× scale level that is extracted through a series of processes of FIGS. 3A and 3B is equal to a size of an image to be detected from among the images of the image pyramid.

Figure 4A:
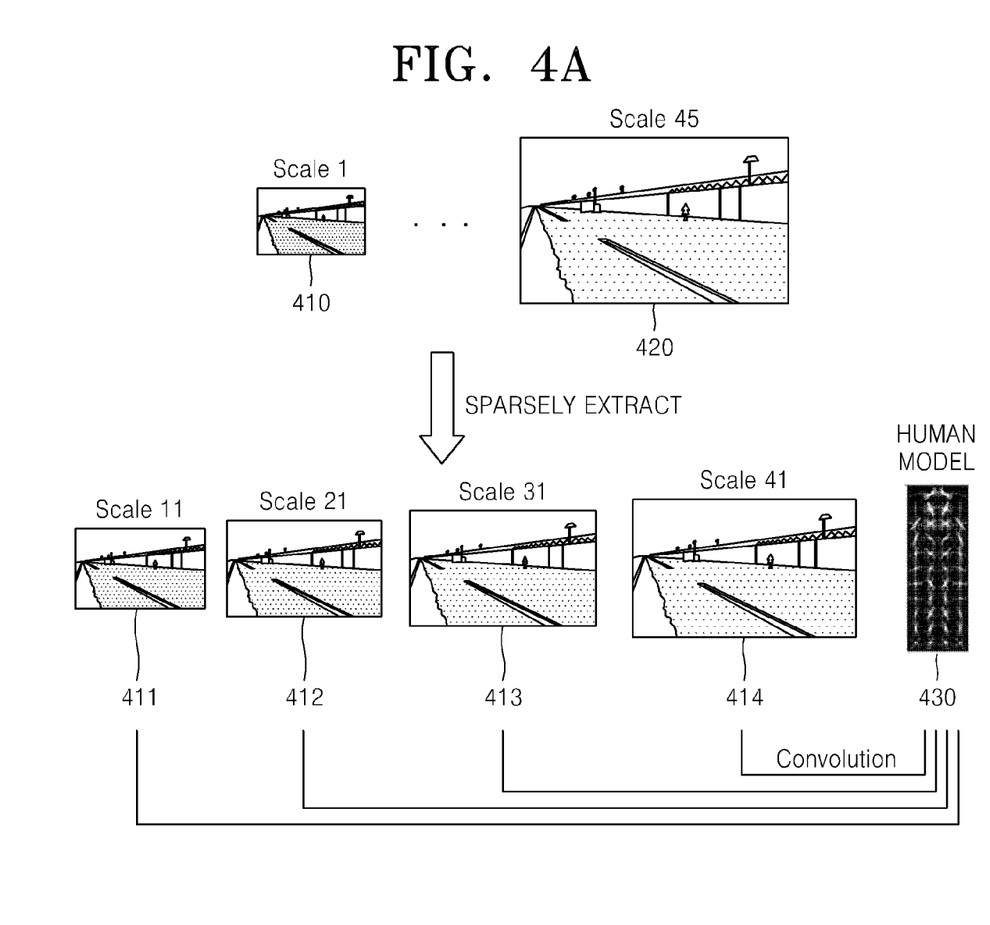
FIG. 4A is a view for explaining a test of adaptively matching each of images having various scale levels of an image pyramid to a human model, according to an exemplary embodiment.
Figure 4B:
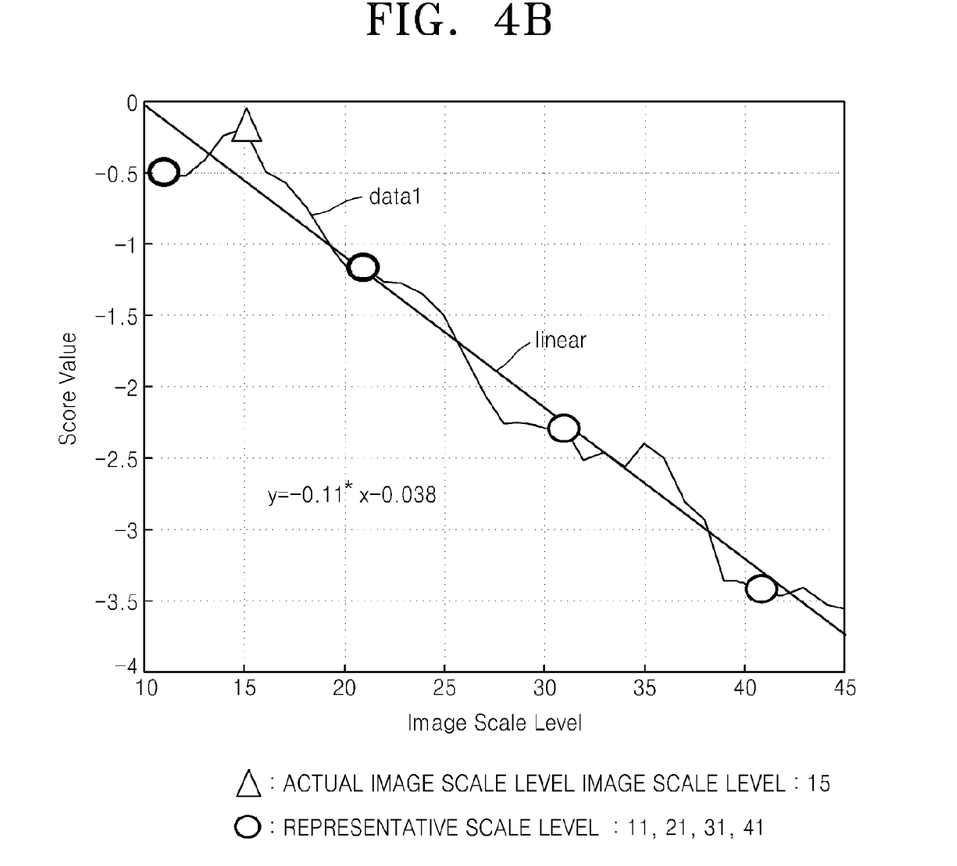
FIG. 4B is a graph illustrating a result of the test of FIG. 4A, according to an exemplary embodiment.

FIGS. 4A and 4B are views for explaining a test of adaptively matching each of images having various scale levels of an image pyramid to a human model 430 and illustrating a result of the test, according to an embodiment.

Referring to FIG. 4A, four representative candidate images 411, 412, 413, and 414 are sparsely extracted in an alignment order of an image pyramid from the image pyramid including 45 images having different scale levels, and each of matching scores is calculated by matching each of the representative candidate images 411, 412, 413, and 414 to the human model 430 by using a convolution algorithm.

Referring to FIG. 4B, when matching scores of the four representative candidate images 411, 412, 413, and 414 of FIG. 4A are compared, the representative candidate image 411 having a scale level of 11 has a highest matching score. Also, in the graph of FIG. 4B, an image having a scale level of 15 around the representative candidate image 411 having the scale level of 11 which has the highest matching score from among the representative candidate images 411, 412, 413, and 414 has a highest matching value from among the 45 images having the representative candidate images of the image pyramid. That is, a local maximum value around a sample having a highest value from among sparsely extracted samples is a global maximum value. In particular, such a conclusion may be proved mathematically because matching scores are in a linear relationship with scale levels of the pyramid image as shown in FIG. 4B.

According to the test of FIGS. 4A and 4B, when image processing is performed on a selected scale level by calculating matching scores of 45 scale levels, a speed is about 75% higher than that using a conventional method.

According to the above exemplary embodiments, when samples are sparsely extracted according to scale levels of an image pyramid, a scale level having a highest matching score is searched for about a scale level selected from among the extracted samples, and image processing is performed on the scale level, a time taken to extract a feature point or perform other image processing based on the image pyramid according to an SIFT algorithm, an SURF algorithm, or the like may be greatly reduced. Since a scale level which does not need to be considered may be effectively filtered, an accuracy rate may be increased and a false positive rate may be reduced.

The exemplary embodiments may be embodied as computer-readable codes in a computer-readable recording medium, or to be transmitted through a transmission medium. The computer-readable recording medium may be any recording apparatus capable of storing data that is read by a computer system. Examples of the computer-readable recording medium include read-only memories (ROMs), random-access memories (RAMs), CD-ROMs, magnetic tapes, floppy disks, and optical data storage devices. The computer readable medium may be distributed among computer systems that are interconnected through a network, and the present invention may be stored and implemented as computer-readable codes in the distributed system. Functional programs, codes, and code segments for embodying the exemplary embodiments may be easily derived by programmers in the technical field to which the exemplary embodiments pertain.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. An adaptive image processing apparatus comprising:
   a first matching unit which selects a plurality of representative candidate images from among a plurality of images included in a image pyramid so that scale levels of the selected plurality of representative candidate images are differentiated over a coarse interval and calculates a first matching score between each of the plurality of representative candidate images and a target model;
   a second matching unit which selects one scale level from among the scale levels of the plurality of representative candidate images based on the first matching score and calculates a second matching score between the target model and each of images that have the selected scale level and other scale levels differentiated over a fine interval from the selected scale level in a dense scale level range, the fine interval being narrower than the coarse interval;
   a representative scale level selecting unit which selects at least one of the scale levels included in the dense scale level range as a representative scale level based on the second matching scores; and
   an image processing unit which performs image processing based on an image having the selected representative scale level.

2. The apparatus of claim 1, wherein the first matching unit selects the plurality of representative candidate images to be separated apart by the same coarse interval in an alignment order in the image pyramid.

3. The apparatus of claim 2, wherein the dense scale level range is determined to include a predefined number of scale levels above and below the scale level selected by the second matching unit in the alignment order in the image pyramid.

4. The apparatus of claim 1, wherein the scale levels included in the dense scale level range are determined based on at least one of a number of the plurality of images having different scale levels in the image pyramid, a number of the plurality of representative candidate images, and the coarse interval between the plurality of representative candidate images in the alignment order in the image pyramid.

5. The apparatus of claim 1, wherein the first matching unit extracts representative candidate images as samples by using a systematic sampling method.

6. The apparatus of claim 1, wherein the second matching unit selects the scale level of a representative candidate image having a highest first matching score from among the scale levels of the plurality of representative candidate images.

7. The apparatus of claim 1, wherein the representative scale level selecting unit selects, as a representative scale level:
   a scale level having a second matching score equal to or greater than a threshold value set according to an algorithm for the image processing from among the scale levels included in the dense scale level range; or a scale level having a highest second matching score from among the scale levels included in the dense scale level range.

8. The apparatus of claim 1, wherein the first matching score is calculated by matching each of the plurality of representative candidate images to the target model by using a convolution algorithm or a correlation coefficient-based algorithm.

9. The apparatus of claim 1, wherein the image processing unit extracts an object related to the target model from an image of the representative scale level.

10. The apparatus of claim 1, wherein the target model is a model formed by statistically learning feature information of at least one object from among a human, a non-human animal, and a vehicle.

11. An adaptive image processing method comprising:
selecting a plurality of representative candidate images from among a plurality of images included in an image pyramid and having different scale levels so that the difference scale levels of the selected plurality of representative candidate images are differentiated over a coarse interval;
calculating a first matching score between each of the plurality of representative candidate images and a target model;
selecting one scale level from among the scale levels of the plurality of representative candidate images based on the first matching score;
calculating a second matching score between the target model and each of images that have the selected scale level and other scale levels differentiated over a interval from the selected scale level in a dense scale level range, the fine interval being narrower than the coarse interval;
selecting at least one from among the scale levels included in the dense scale level range based on the second matching scores as a representative scale level; and
performing image processing based on an image having the representative scale level.

12. The method of claim 11, wherein the plurality of representative candidate images are selected to be separated apart by the same coarse interval in an alignment order in the image pyramid.

13. The method of claim 12, wherein the dense scale level range is determined to include a predefined number of scale levels above and below the scale level selected in the selecting one scale level from among scale levels of the plurality of representative candidate images based on the first matching score, in the alignment order in the image pyramid.

14. The method of claim 11, wherein the scale levels included in the dense scale level range are determined based on at least one of a number of the plurality of images having different scale levels in the image pyramid, a number of the plurality of representative candidate images, and the coarse interval between the plurality of representative candidate images in the alignment order in the image pyramid.

15. The method of claim 11, wherein the plurality of representative candidate images are samples extracted by using a systematic sampling method.

16. The method of claim 11, wherein the scale level, selected in the selecting one scale level from among scale levels of the plurality of representative candidate images based on the first matching score, is a scale level of a representative candidate image having a first highest matching score from among the scale levels of the plurality of representative candidate images.

17. The method of claim 11, wherein the representative scale level is:
a scale level having a second matching score equal to or greater than a threshold value set according to an algorithm for the image processing from among the scale levels included in the dense scale level range; or
a scale level having a highest second matching score from among the scale levels included in the dense scale level range.

18. The method of claim 11, wherein the first matching score is calculated by matching each of the plurality of representative candidate images to the target model by using a convolution algorithm or a correlation coefficient-based algorithm.

19. The method of claim 11, wherein the performing the image processing comprises extracting an object related to the target model from an image of the representative scale level.

20. The method of claim 11, wherein the target model is a model formed by statistically learning feature information of at least one object from among a human, a non-human animal, and a vehicle.

* * * * *